May 18, 1965   H. E. BRAYER ETAL   3,184,130
AUTOMATIC REWIND PROJECTOR
Filed Nov. 9, 1962   3 Sheets-Sheet 1
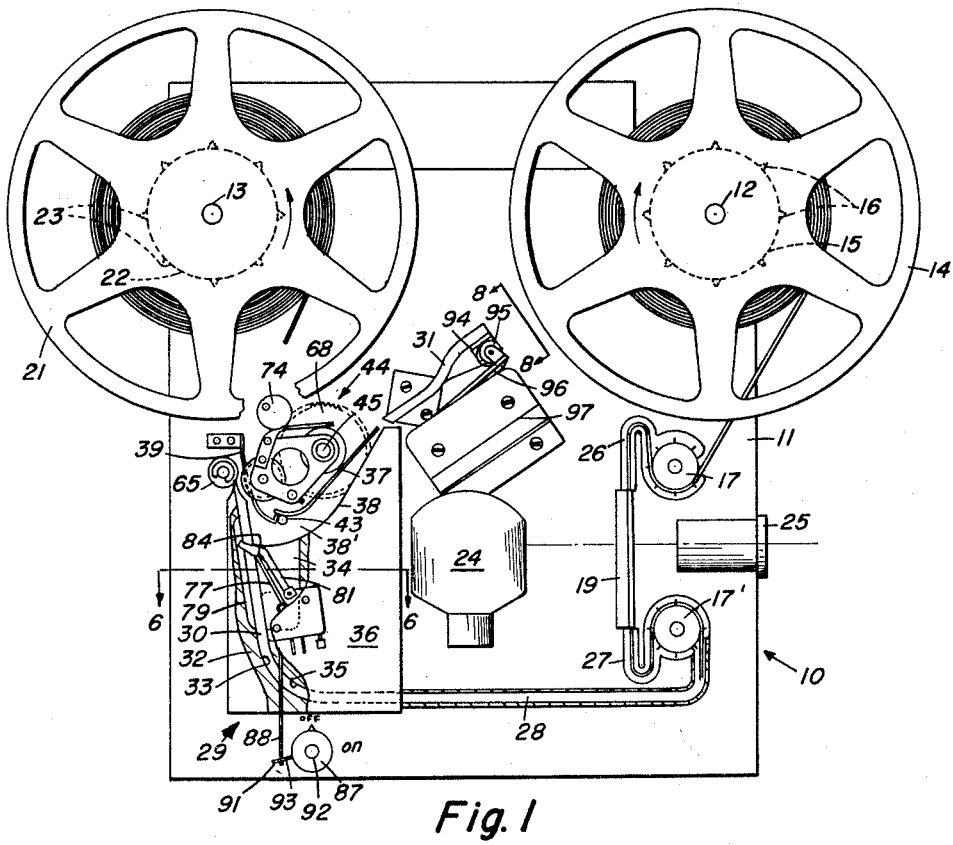
Fig. 1
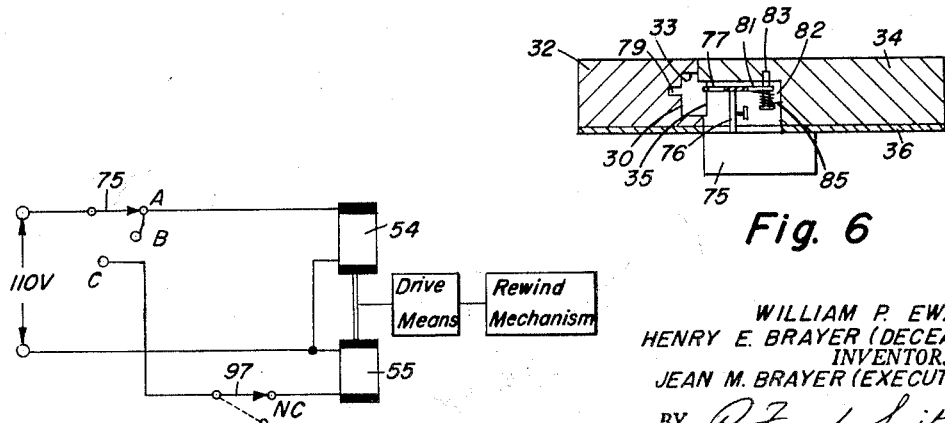
Fig. 6
Fig. 7
WILLIAM P. EWALD
HENRY E. BRAYER (DECEASED)
INVENTORS
JEAN M. BRAYER (EXECUTRIX)
BY R. Frank Smith
Steve W. Grambau
ATTORNEYS May 18, 1965 H. E. BRAYER ETAL 3,184,130
AUTOMATIC REWIND PROJECTOR
Filed Nov. 9, 1962 3 Sheets-Sheet 2
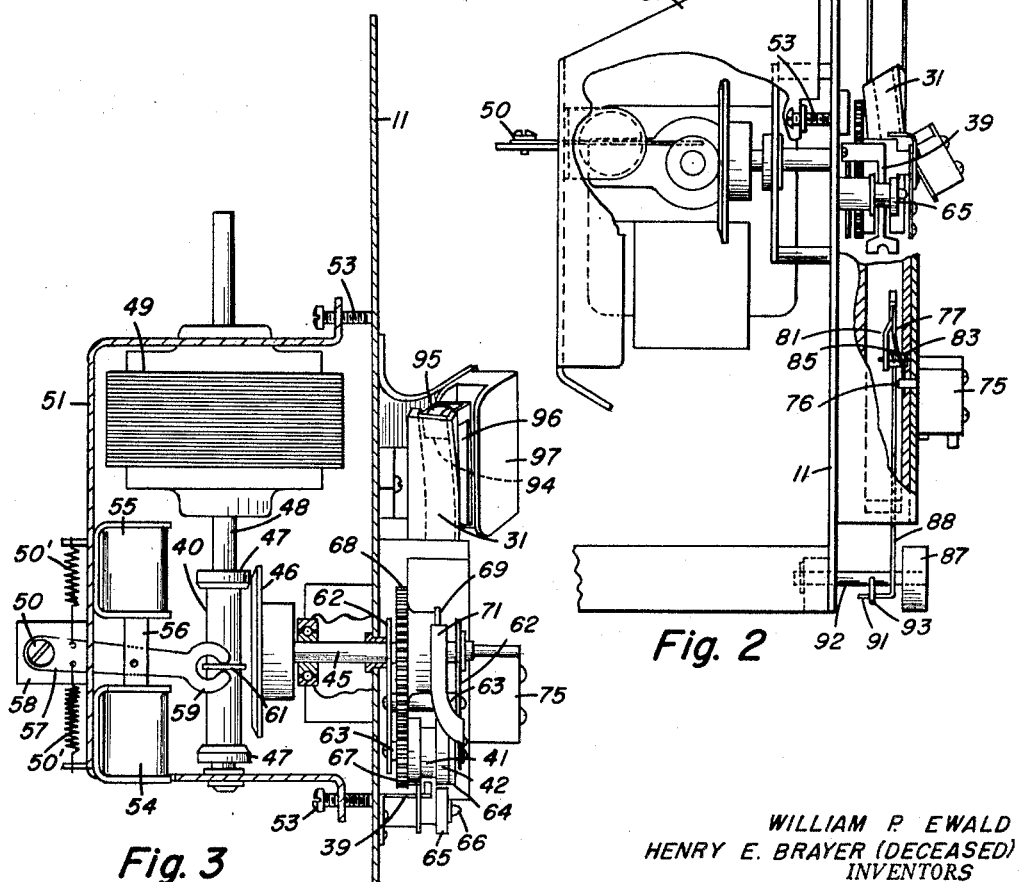
WILLIAM P. EWALD
HENRY E. BRAYER (DECEASED)
INVENTORS
JEAN M. BRAYER (EXECUTRIX)
BY
ATTORNEYS

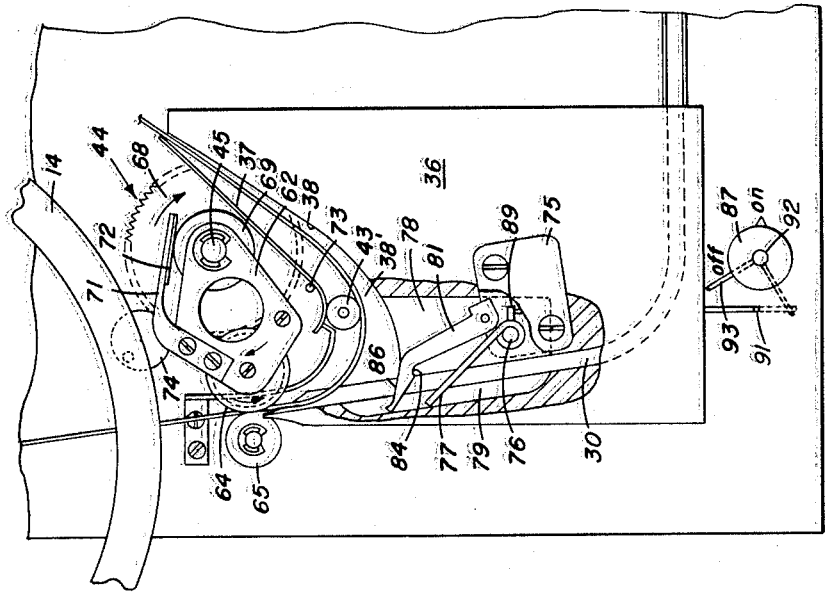
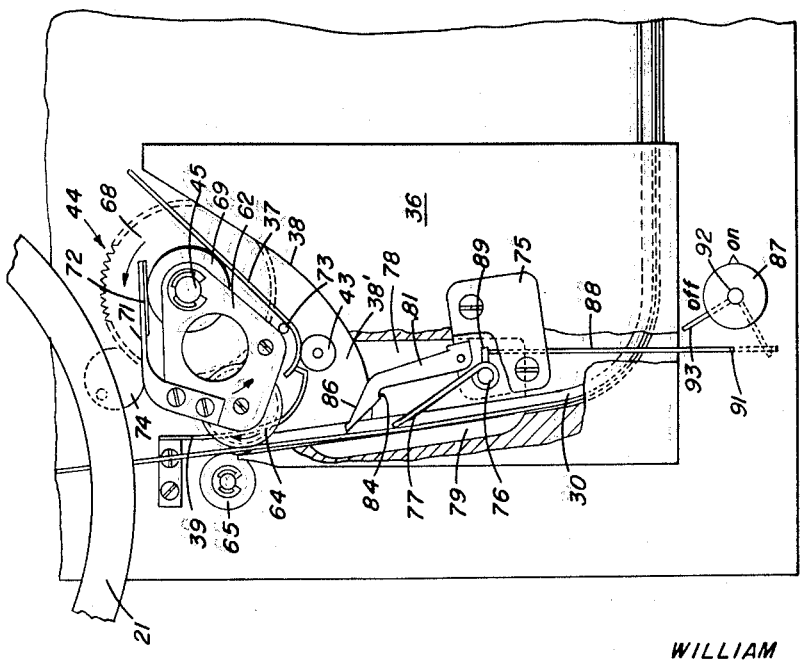
WILLIAM P. EWALD
HENRY E. BRAYER (DECEASED)
INVENTORS
JEAN M. BRAYER (EXECUTRIX)
ATTORNEYS

United States Patent Office 3,184,130
Patented May 18, 1965

3,184,130
AUTOMATIC REWIND PROJECTOR
Henry E. Brayer, deceased, late of Rochester, N.Y., by Jean M. Brayer, executrix, Rochester, N.Y., and William P. Ewald, Rochester, N.Y., assignors to Eastman Kodak Company, Rochester, N.Y., a corporation of New Jersey
Filed Nov. 9, 1962, Ser. No. 236,743
17 Claims. (Cl. 226—11)

This invention relates generally to projectors, and more specifically to an improved motion-picture projector adapted to automatically rewind the film from the take-up reel back onto the supply reel after the film has been projected.

In all of the motion-picture projectors that applicants are aware of, the film is normally transported by sprockets from a supply reel through an apertured film gate and onto a take-up reel. The apertured film gate is positioned along the optical axis of the projector, and a film pull down claw mechanism of known type is incorporated in the projector for intermittently advancing the film past the aperture one frame at a time for projection. After all of the film has been projected and wound on the take-up reel, the operator normally manually connects the trailing end of the film to the supply reel and operates the projector to rewind the projected film from the take-up reel back onto the supply reel. Applicants' improved invention eliminates all of the manual operations involved in the prior-art type of motion-picture projector, and provides an improved motion-picture projector in which the film is transported through one path for projection, and after the film has been projected, is automatically transported in the opposite direction along a different path onto the supply reel for rewinding.

It is therefore one of the primary objects of the present invention to provide an improved motion-picture projector in which the film is transported along one path for projection, and upon completion thereof is automatically returned to the supply reel via another alternate path for rewinding.

Another object of the invention is to provide an improved motion-picture projector having switch means actuable by the film for controlling the movement of a drive member into engagement with the film and for reversing the direction of rotation of the drive member.

Still another object of this invention is to provide an improved motion-picture projector in which the projection and rewinding of the film is entirely automatic except for the initial manual introduction of the leading end of the film from the supply reel into the projector.

A further object of the invention is the provision of an improved automatic motion-picture having a guideway for twisting the film through an angle with respect to the supply reel axis to minimize the windage effect of the reel on the trailing end of the film to facilitate its attachment to the reel.

Objects and advantages other than those set forth above will be apparent from the following description when read in connection with the accompanying drawings, in which:

FIG. 1 is a side elevation view of an embodiment of the present invention incorporated in a motion-picture projector, a portion of which is shown schematically;

FIG. 2 is a rear end elevation view of the projector of FIG. 1;

FIG. 3 is a top plan view of a portion of the projector of FIG. 1 with the take-up reel removed;

FIG. 4 is a segmental enlarged view of a portion of the structure of FIG. 1 showing the position of the rewind mechanism as the film is being projected and taken up on the take-up reel;

FIG. 5 is a view similar to FIG. 4 showing the position of the rewind mechanism as it transports the film along a different path from the take-up reel onto the supply reel;

FIG. 6 is an enlarged view in section taken along line 6—6 of FIG. 1;

FIG. 7 shows a schematic wiring diagram for the projector; and

FIG. 8 is an enlarged end view of a portion of the projector taken from line 8—8 of FIG. 1.

As shown in the drawings, an illustrated embodiment of the invention is incorporated in a motion-picture projector 10 of known type comprising a vertical support plate 11 for rotatably supporting supply and take-up shafts 12, 13 respectively, a supply reel 14 mounted on supply shaft 12 and having a hub 15 with radially extending teeth 16 thereon, drive sprockets 17, 17' for transporting a film 18 to and from an apertured film gate 19 through which film 18 is transported by the usual intermittent pulldown mechanism, not shown, and a take-up reel 21 mounted on take-up shaft 13 having a hub 22 with teeth 23 thereon for receiving the projected film 18. As the film is intermittently advanced through the apertured film gate 19 one frame at a time, it is projected by means of a lamp 24 and lens 25. Film guides 26, 27 are incorporated in projector 10 for guiding film 18 from sprocket 17 to gate 19 and from gate 19 to sprocket 17'. Since all of the recited mechanisms are well-known in the projector art and only indirectly form a part of the invention, they are shown partly in schematic form in FIG. 1. Although the invention is shown in the drawings in connection with a specific projection system, applicants have no intention of so limiting their invention which is readily applicable to any type of projection system. In this connection, it is believed that applicants' invention would have its greatest utility in connection with an automatic loop-forming projector of which many forms are shown in the art for automatically threading the film through the projection gate.

A film duct 28 of rectangular cross section is mounted on plate 11 and has one end adjacent sprocket 17' and its opposite end connected to a film guide mechanism 29 to provide, in combination with film gate 19 and guides 26, 27, a film path from supply reel 14 to take-up reel 21 for projection. The film guide mechanism 29 further, in combination with a film duct 31 of rectangular cross section, provides a different path for returning the projected film 18 from take-up reel 21 to supply reel 14. The duct 31 has one end adjacent mechanism 29, and its opposite end adjacent the periphery of supply reel 14 for guiding the film thereto. This opposite end of duct 31 is twisted to direct the film in a plane at an angle to the axis of reel 14 to offer greater resistance to the air movement created by the rotating reel. This air movement normally tends to move the film out of the path of teeth 16 on hub 15.

The film guide mechanism 29 as best seen in FIGS. 1 and 6 essentially comprises a first block 32 secured to plate 11 and having a groove 33 therein, and a second block 34 secured to plate 11 adjacent block 32 and having a groove 35 in register with groove 33 to form a passageway 30 for film 18. A cover plate 36 is secured to blocks 32, 34, and a guide plate 37 is secured to the upper end of block 34. Another guide element 39 (see FIGS. 2–5) has one end secured to plate 11, its intermediate portion extending through a groove 41 in a rubber ring 42 to be explained in greater detail hereinafter, and its free end terminating adjacent one end of guide plate 37. The plate 37 and element 39 cooperate with upper surface 38 to form a film passageway 38' therebetween. An idler roller 43 is rotatably supported by block 34 at the junction of element 39 and plate 37 for preventing film 18 from frictionally sliding on element 39 and plate 37 during the rewinding operation.

A rewind mechanism indicated generally by the numeral 44 is disposed above blocks 32, 34 for automatically reversing the direction of movement of film 18 after it has been projected, and directing the film along an alternate path for rewinding. This rewind mechanism 44 comprises a shaft 45 rotatably journaled in plate 11, and driven by any suitable drive means. In this instance, the drive means is shown in FIGS. 2 and 3 as a disk 46 secured to one end of shaft 45 and selectively engageable by one of two axially spaced apart rubber drive rolls 47 secured to an axially movable sleeve 40 slidably mounted on and keyed to drive shaft 48 of a drive motor 49. The motor 49 and drive shaft 48 are supported by a bracket 51 pivoted at 52 (see FIG. 2). The bracket 51 further has set screws 53 for adjustably positioning bracket 51, and hence motor 49 and drive shaft 48 with respect to shaft 45. The direction of rotation of disk 46 and shaft 45 is controlled by a pair of solenoids 54, 55 having a common armature 56 secured to a lever 57, one end of which is pivotally mounted on a stud 50 carried by a struck-out portion 58 of bracket 51, and the opposite end 59 forked for receiving a ring 61 therebetween secured to sleeve 40. A pair of identical, opposed springs 50' are secured to the sides of lever 57 to normally hold sleeve 40 and rolls 47 in a neutral position in which disk 46 is stationary. It is obvious that when solenoid 54 is energized, lever 57 will be moved down as seen in FIG. 3 for moving roller 47 into engagement with disk 46 for driving same in one direction. When solenoid 54 is deenergized and solenoid 55 energized, lever 57 is moved up moving roller 47 into engagement with disk 46 for driving it in the opposite direction. The drive means is connected to the drive sprockets 17, 17', pulldown mechanism 19 and supply and take-up reels 14, 21 respectively, by any conventional means well known in the art, not shown, so that when the sprockets and pulldown mechanism are driven to transport film 18 in a direction for projection, the reels are driven in opposite directions as indicated by the arrows in FIG. 1. On the other hand, when the drive means drives the rewind mechanism 44 in the opposite direction for rewinding, the reels 14, 21 are both reversed in direction. If desired, a separate reversible drive motor may be used for the reels 14, 21, and the direction of rotation of the motor controlled by the position of lever 57 or sleeve 40.

A pair of toggle arms 62 (see FIG. 3) spaced apart by spacers 63 has one end thereof pivotally mounted on the opposite end of shaft 45. The opposite end of arms 62 rotatably support a rewind drive roller 64 which in turn supports the aforementioned rubber ring 42. The peripheral groove 41 in ring 42 is in register with the images on film 18, thereby eliminating damage to the film when the ring 42 is moved into engagement with a peripherally undercut idler roller 65 which is rotatably mounted on a shaft 66 carried by plate 11. A gear 67 is also secured to rewind roller 64 and is driven by a gear 68 mounted on shaft 45. A metal disk 69 is secured to the hub of gear 68, and a leaf spring 71 has one end secured to one of the arms 62, and its free end resiliently bearing by its inherent spring pressure against the periphery of disk 69. A frictional material 72, such as rubber or the like, is secured to the under surface of spring 71 and is in engagement with disk 69. Upon rotation of shaft 45 and gear 68 in the direction of the arrow in FIG. 4, disk 69 exerts a force against leaf spring 71 causing toggle arms 63 and roller 64 as a unit to move in a counterclockwise direction until the side of one arm 63 engages a stop 73 secured to plate 11. In this inoperative position, rubber ring 42 is out of engagement with idler roller 65, but is driven in a clockwise direction to provide some assistance in transporting the projected film 18 onto take-up reel 21. When shaft 45 and gear 68 are rotated in a clockwise direction as seen in FIG. 5, disk 69 by virtue of its frictional engagement with leaf spring 71 coupled with the counterclockwise rotation of ring 42 in engagement with film 18 moves arms 63 and roller 64 as a unit in a clockwise direction urging rubber ring 42 into engagement with idler roller 65. Once ring 42 engages roller 65, its direction of rotation serves to hold it in engagement therewith. In this operative position, rewind roller 64 is being driven in a counterclockwise direction for transporting film 18 between rollers 64, 65 into film passageway 38' for rewinding. The amount of pressure exerted by rubber ring 42 against idler roller 65 may be controlled by an adjustable eccentric 74 mounted on plate 11 and adapted to provide a stop for one of the arms 63.

A control system for the rewind mechanism 44 comprises a microswitch 75 mounted on cover plate 36 and having a rotatable shaft 76 onto which an actuating element 77 is mounted. The element 77 extends into a recess 82 in block 34, and is adapted when unsupported to fall by gravity into a slot 79 in block 32 as best seen in FIGS. 5 and 6. The actuating element 77 controls movement of the microswitch 75 between three positions "A," "B" and "C" as seen in FIG. 7, and when element 77 is out of slot 79, the switch 75 is in either position "A" or "B," both of which are connected together, and when it is in slot 79 as seen in FIG. 5, the switch 75 is in position "C." The actuating element 77 may be provided with a spring for urging element 77 in a counterclockwise direction into slot 79 rather than relying on gravity alone. A flat arm 81 located in recess 78 is pivotally mounted at one end on a stud 83 secured to block 34. The opposite end of arm 81 has a shoulder 84 on its lower surface forming a stop for the end of actuating element 77 for holding it out of slot 79 as seen in FIG. 1, and the switch 75 in position "A." The arm 81 is urged by a spring 85 in a counterclockwise direction causing one end thereof to bottom in slot 79 as seen in FIG. 5. In this position, the upper surface 86 of arm 81 completely obstructs passageway 30 (see FIG. 4) and forms a guide for deflecting the film 18 into film passageway 38' and directing the film toward supply reel 14.

A linkage system is provided for automatically returning microswitch 75 into the "A" position when a projector knob 87 is turned from its "On" position to its "Off" position. This linkage as best seen in FIGS. 2, 4, and 5 comprises a flexible lever 88 having one end connected to a radially extending pin 89 on shaft 76, and its opposite end bent to form a lug 91. A shaft 92 on which knob 87 is mounted has a radially extending pin 93 adapted when knob 87 is moved to its "Off" position to engage lug 91 and urge lever 88 downwardly moving element 77 in a clockwise direction out of slot 79 and into position "A." When knob 87 is moved into its "On" position to start projector 10, pin 93 is retracted from lug 91 and microswitch 75 remains latched by shoulder 84 in position "A."

As shown in FIG. 1, the underside of one end of film duct 31 has a notch therein (see FIGS. 3 and 8) forming a shoulder 94 against which a roller 95 carried by an actuating element 96 of a second microswitch 97 is urged by a spring integral therewith for holding microswitch 97 in its normally closed position indicated at NC in FIG. 7. With roller 95 in engagement with shoulder 94, space still remains between roller 95 and the opposite surface of duct 31 to allow film 18 to pass therebetween. The leading end of the film from duct 31 engages teeth 16 at the underside of reel hub 15, and is wound thereon upon rotation of reel 14 in a counterclockwise direction during rewinding. The reach of film between shoulder 94 and hub 15 when subjected to tension by the rewinding action pulls roller 95 and element 96 in a clockwise direction, and opens microswitch 97 as indicated by the dotted line position in FIG. 7. As seen in FIG. 7, this action deenergizes solenoid 55 allowing springs 50' to move the drive means to its neutral position. The rewind mechanism is then moved into its inoperative position due to gravity, and the frictional force between film 18 and roller 64. When the rewind mechanism reaches its inoperative position roller 64 is relatively clear of film 18 so that film 18 is rewound on supply reel 14 with essentially no resistance from the rewind mechanism. If desired, the drive system for projector 10 may be designed so that microswitch 97 in its position "O" will cause the drive system to drive supply reel 14 at a high rate of speed for faster rewinding as is old in the art.

When the projector switch 87 is moved from its "On" position into its "Off" position to shut off the projector, actuating element 77 is moved in a clockwise direction, causing its end to cam arm 81 against its spring 85 until element 77 is moved past shoulder 84. When this occurs, arm 81 is urged by its spring 85 against the bottom of slot 79, and shoulder 84 releasably holds actuating element 77 with switch 75 in its normal position "A" as seen in FIG. 1.

To operate the projector from its shut off position, the operator will initially place a take-up reel 21 on take-up shaft 13, and a supply reel 14 of film 18 on supply shaft 12. The operator will then move projector knob 87 from an "Off" position to the "On" position energizing a projector drive motor, which may be motor 49 or a separator motor, not shown, for driving the supply and take-up reels 14, 21 respectively through slip clutches as is well known in the art. The operator will then take the leading end of film 18 and insert it between film guide 26 and drive sprocket 17. The drive sprocket 17 will engage the film perforations and transport film 18 through film guide 26 into film gate 19 where the film pulldown mechanism will advance the film intermittently one frame at a time for projection. The film 18 leaving film gate 19 passes through film guide 27 and over drive sprocket 17' which transports the film through film duct 28 and along passageway 30. The leading end of film 18 strikes the end of arm 81 and urges the arm against the bias of its spring 85 out of passageway 30. This releases actuating element 77 which drops into engagement with the edge of film 18 as seen in FIG. 4, moving microswitch 75 into position "B." Since "A" and "B" are connected (see FIG. 7), no change in projector operation results. The film end is directed towards hub 22 of take-up reel 21 and is automatically caught by teeth 23 thereon for winding the film on take-up reel 21. After all of the film has been projected, the trailing end of film 18 releases actuating element 77 and arm 81 which drop into slot 79 as seen in FIG. 5, moving microswitch 75 to position "C" and closing off passageway 30. This deenergizes solenoid 54 and energizes solenoid 55 for driving disk 46 and shaft 45 in a clockwise direction so that roller 64 is driven in a counterclockwise direction (see FIG. 5). Immediately, by virtue of the rotation of ring 42, and the spring 71 and disk 69 connection, the arms 62 and roller 64 are moved as a unit in a clockwise direction causing ring 42 to urge the trailing end of film 18 against idler roller 65. The rubber ring 42 transports the film through passageway 38' and into engagement with the teeth 16 on hub 15 of supply reel 14 which automatically rewinds the film 18 thereon. As soon as the trailing end of the film becomes attached to hub 15 and tension is applied to the reach of film extending between shoulder 94 and reel hub 15, the tensioned film urges microswitch 97 into position "O," deenergizing solenoid 55. Spring 50' moves sleeve 40 and roller 47 into their neutral position in which disk 46 is not driven. Consequently arms 62 and roller 64 are moved as a unity by virtue of gravity, and the pull of film 18 in a counterclockwise direction into its inoperative position withdrawing ring 42 from roller 65 so that it will not present any significant resistance to the rewinding of film 18 onto supply reel 14.

The invention has been described in detail with particular reference to an illustrated embodiment thereof, but it will be understood that variations and modifications can be effected within the spirit and scope of the invention as described hereinabove and as defined in the appended claims.

We claim:

1. In a motion picture projector having a film source and a film take-up means, the combination comprising:
   (a) first means for transporting said film from a film source through said projector along one path extending between said film source and said film take-up means for projection;
   (b) second means movable from a normal inoperative position to an operative position into engagement with said projected film along said one path for transporting same back to said film source over a different path for rewinding; and
   (c) control means for said second means and responsive to the absence of film in a portion of said one path spaced from said film source for moving said second means from its inoperative to its operative position.

2. In a motion picture projector having a film source and a film take-up means, the combination comprising:
   (a) first means for transporting said film from a film source through said projector in one direction and along one path extending between said film source and said film take-up means for projection;
   (b) second means movable from a normal inoperative position to an operative position into engagement with said projected film along said one path for transporting said projected film in the opposite direction and along a different path back to said film source for rewinding; and
   (c) control means for said second means and including a sensing element responsive to the absence of film in a portion of said one path spaced from said film source for moving said second means from its inoperative to its operative position.

3. The invention according to claim 2 wherein said second means comprises a rotatable drive roller; a support for said drive roller movable between said operative and inoperative positions for moving said drive roller respectively into and out of driving engagement with said film; drive means movable in a first direction for driving said drive roller in one direction of rotation, and in a second direction for driving said drive roller in the opposite direction of rotation; and means interconnecting said support and driving means for moving said support into either of said operative and inoperative positions in response to movement of said drive means in either of said first and second directions respectively.

4. The invention according to claim 3 wherein said driving means comprises a rotatable disk, and said interconnecting means comprises a friction member secured to said support and in frictional engagement with said disk.

5. The invention according to claim 4 wherein said friction member comprises a leaf spring having one end secured to said support, and a friction material secured to the other end of said spring and urged by said spring into engagement with the periphery of said disk.

6. The invention according to claim 2 wherein said control means comprises a first switch connected to said sensing element which is movable into and out of said one path, and a latch for said sensing element movable between latched and unlatched positions, and adapted in its latched position to releasably hold said sensing element out of said one path and to have a portion of said latch extend into said one path, said latch being released to release said sensing element when the film transported along said one path strikes said latch portion and moves it out of said one path, said latch portion further adapted in its unlatched position to move into said one path and block it off after the trailing end of said film passes said latch portion.

7. The invention according to claim 6 wherein said control means further includes a second switch electrically connected to said first switch and having an actuating element movable from a normal first position to a second position by a portion of the film in said different path as tension is applied thereto during the rewinding operation for operating said control means to move said second means to its inoperative position.

8. In a motion picture projector, the combination comprising:
   (a) means for transporting a film from a film source through said projector in one direction and along one path for projection;
   (b) rewind means movable from an inoperative position to an operative position into engagement with said film for transporting said projected film in the opposite direction and along a different path back to said film source for rewinding;
   (c) a reversible drive means connected to said rewind means to move the same into its operative position, when driven in one direction, and to move said rewind means into its inoperative position when driven in the opposite direction;
   (d) shiftable control means movable between two positions for selecting the direction of drive of said drive means;
   (e) and means for shifting said control means between said two positions, and including a movable film sensing member responsive to the presence of film in said one path for holding said control means in one of said two positions, and responsive to the absence of film in said one path for shifting said control means to the other of said two positions.

9. The invention according to claim 8 wherein said rewind means comprises a support, a drive member carried by said support and movable into and out of driving engagement with said film, and a friction member secured to said support and having a portion thereof in frictional engagement with said drive means.

10. The invention according to claim 9 wherein said support is pivotal, said drive member is a roller, and said friction member has one end secured to said support and its other end in frictional engagement with said drive means.

11. The invention according to claim 10 wherein said drive means comprises a rotatable disk, and said friction member is a leaf spring having one end secured to said support, and a friction material secured to the other end of said spring and urged by said spring into engagement with the periphery of said disk.

12. In a motion picture projector, the combination comprising:
   (a) first means for transporting a film from a film source through said projector in one direction and along one path for projection;
   (b) second means movable from a normal inoperative position to an operative position for transporting said projected film in the opposite direction and along a different path back to said film source for rewinding; and
   (c) control means for said second means responsive successively to (1) the presence of film in said one path for holding said second means in its inoperative position, (2) the absence of film in said one path for closing off said one path and moving said second means into its operative position; and (3) the presence of said film in said different path as tension is applied thereto during the rewinding operation for moving said second means into its inoperative position.

13. The invention according to claim 12 wherein said control means comprises a drive means connected to said rewind means to move the rewind means into its operative position, when driven in one direction, and into its inoperative position when driven in the opposite direction, and said rewind means comprises a support, a drive member carried by said support and movable into and out of driving engagement with said film, and a friction member secured to said support and having a portion thereof in frictional engagement with said drive means.

14. The invention according to claim 13 wherein said support is pivoted, said drive member is a roller, and said friction member has one end secured to said support and its other end in frictional engagement with said drive means.

15. The invention according to claim 14 wherein said drive means comprises a rotatable disk, and said friction member is a leaf spring having one end secured to said support, and a friction material secured to the other end of said spring and urged by said spring into engagement with the periphery of said disk.

16. The invention according to claim 12 wherein said control means comprises a first switch having a sensing element movable into and out of said one path, and a latch for said sensing element movable between latched and unlatched positions, and adapted in its latched position to releasably hold said sensing element out of said one path and to have a portion of said latch extend into said one path, said latch being released to release said sensing element when the film transported along said one path strikes said latch portion and moves it out of said one path, said latch portion further adapted in its unlatched position to move into said one path and block it off after the trailing end of said film passes said latch portion.

17. The invention according to claim 16 wherein said control means further includes a second switch electrically connected to said first switch and having an actuating element movable from a normal first position to a second position by a portion of the film in said different path as tension is applied thereto during the rewinding operation for operating said control means to move said second means to its inoperative position.

References Cited by the Examiner
UNITED STATES PATENTS

| | | | |
|---|---|---|---|
| 2,705,639 | 4/55 | Lekas | 226—50 X |
| 2,891,736 | 6/59 | Blaes | 226—92 X |
| 3,081,668 | 3/63 | Nistri | 352—123 |

ROBERT B. REEVES, *Acting Primary Examiner.*

ANDRES H. NIELSEN, WILLIAM B. LA BORDE,
*Examiners.*